United States Patent [19]
Delle Cave

[11] Patent Number: 5,498,330
[45] Date of Patent: Mar. 12, 1996

[54] GRAY WATER RECLAMATION SYSTEM INCLUDING PLURAL FILTRATION STEPS

[76] Inventor: Steven F. Delle Cave, 1145 Whippoorwill La., Naples, Fla. 33999

[21] Appl. No.: 152,829

[22] Filed: Nov. 15, 1993

[51] Int. Cl.⁶ .................................................. B01D 29/60
[52] U.S. Cl. .................. 210/103; 4/665; 210/104; 210/167; 210/143; 210/259; 210/411; 405/37
[58] Field of Search ............................ 210/90, 103, 109, 210/110, 220, 221.2, 167, 257.1, 258, 259, 411, 139, 108, 138, 104, 85, 87, 143; 405/37; 4/665

[56] References Cited

U.S. PATENT DOCUMENTS

| | | | |
|---|---|---|---|
| 2,768,028 | 10/1956 | Robinson | 405/37 |
| 3,543,294 | 11/1970 | Boester | 210/220 |
| 3,915,857 | 10/1975 | Olson | 210/104 |
| 4,112,972 | 9/1978 | Lajeuness . | |
| 4,115,879 | 9/1978 | Toms | 210/138 |
| 4,134,833 | 1/1979 | McCormick | 210/121 |
| 4,145,279 | 3/1979 | Selby | 210/108 |
| 4,162,218 | 7/1979 | McCormick | 210/167 |
| 4,197,597 | 4/1980 | Toms | 210/138 |
| 5,039,407 | 8/1991 | Mohrman | 210/167 |
| 5,084,920 | 2/1992 | Kimball | 4/665 |
| 5,099,874 | 3/1992 | Della Cave . | |
| 5,100,540 | 3/1992 | Ramirez et al. | 210/258 |
| 5,106,493 | 4/1992 | McIntosh | 210/167 |
| 5,251,346 | 10/1993 | Donati | 4/665 |
| 5,317,766 | 6/1994 | McDonald et al. | 4/665 |

FOREIGN PATENT DOCUMENTS 52-45162  4/1977  Japan ........................ 210/220

Primary Examiner—Joseph W. Drodge
Attorney, Agent, or Firm—William E. Noonan

[57] ABSTRACT

A gray water reclamation system is disclosed. The system includes a gray water filter and a gray water conduit for receiving exclusively gray water from at least one household source and passively delivering the gray water through a water filter to remove impurities therefrom. Filtered water is temporarily stored in an underground tank. A sensing apparatus such as a pressure tank determines when gray water is required by an outside irrigation system, inside toilets or other appliances. Suitable controls direct a pump to transmit water from the storage tank to either irrigation apparatus or, after further filtering, to appliances in need of water.

19 Claims, 4 Drawing Sheets

GRAY WATER RECLAMATION SYSTEM INCLUDING PLURAL FILTRATION STEPS

FIELD OF THE INVENTION

This invention relates to a gray water reclamation system and, more particularly, to a system for passively filtering the gray water that is generated by an individual household and reclaiming such water for use as required in the household's toilets and outside irrigation systems.

BACKGROUND OF THE INVENTION

Waste water generated by a household is typically classified as either black water or gray water. The former refers to water drained from toilets, dishwashers and garbage disposals and directed to a septic or sewage system. This water normally contains high counts of bacteria and is unsuitable for recycling. On the other hand, gray water, which is drained from bathtubs, showers, clothes washers and sinks, generally contains relatively small amounts of soap or detergent. As a result, gray waste water is usually safe to reuse, particularly in toilets and for outdoor irrigation.

Mcintosh, U.S. Pat. No. 5,106,493, discloses a known system for reclaiming and reusing gray water. Therein the waste water is actively pumped through a filter and to a holding tank, where chlorine is added. The water is then pumped as needed to a toilet tank and/or a hose bib. Unfortunately, the Mcintosh system exhibits a number of disadvantages. For example, it is unduly complex and requires both a sump and a pump to actively deliver the gray water through the filter and to the holding tank. Moreover, each gray water appliance is provided with its own solenoid driven valve for selectively discharging the water to either a gray water reclamation line or a sewer line. All of this equipment renders the system complex, expensive and quite susceptible to failure resulting from lightning strikes and other hazards. Furthermore, the chlorine that is added to the water is expensive, toxic and environmentally undesirable.

SUMMARY OF INVENTION

It is therefore an object of this invention to provide an improved gray water reclamation system featuring a simplified, yet efficient construction.

It is a further object of this invention to provide a gray water reclamation system employing an improved gravity filtration device that is arranged within the holding tank of the system.

It is a further object of this invention to provide a gray water reclamation system that reduces the use of harsh chemicals to decontaminate water in the holding or storage tank.

It is a further object of this invention to provide a gray water reclamation system that timely and effectively delivers reclaimed gray water, as needed, to various appliances.

It is a further object of this invention to provide a gray water reclamation system that stores and aerates reclaimed gray water when such water is not required.

It is a further object of this invention to provide a gray water reclamation system that is effectively integrated with the municipal water supply so that water service is not interrupted in the event of a shortage of gray water.

It is a further object of this invention to provide a gray water reclamation system that is effective for use in single family and multifamily residential households.

This invention features a gray water reclamation system, including a gravity water filter. There are gray water conduit means for receiving exclusively gray water from at least one household source and for passively delivering the gray water to the gravity water filter to remove impurities therefrom. Means are provided for temporarily storing the filtered gray water and there is at least one appliance that utilizes the filtered gray water. There are means for sensing that an appliance is in need of gray water and means, responsive to the means for sensing, direct the filtered gray water to the appliance in need of such water.

In a preferred embodiment the system may include a black water discharge conduit for discharging black water from at least one household source. A bypass conduit may communicably interconnect the gray water conduit means and the black water discharge conduit and valve means may be provided for selectively diverting the discharged gray water from the gray water conduit means to the bypass and black water discharge conduits.

Means may be provided for aerating the filtered gray water to reduce the level of bacteria therein. Such means for aerating may include spray jet means and aerator pump means for pumping the filtered gray water through the spray jet means. Alternatively, air may be pumped through the filtered gray water. The tank should be vented to provide a fresh supply of oxygen for aeration. Aerator control means may be provided for operating the aerator pump means at predetermined intervals. The aerator pump means may be automatically deactivated when the filtered gray water in the means for storing falls below a predetermined level.

The means for directing may include means, communicably interconnected between the means for storing and the appliance, for transmitting filtered gray water therethrough. Such means for directing may further include recycling pump means operably engaged with the means for transmitting, for selectively pumping filtered gray water through the means for transmitting from the means for storing to the appliance. The means for transmitting may include a pressure sensing tank. In such cases, the means for sensing may include pressure control means that activate the recycling pump means when the pressure tank falls below a first threshold pressure level and deactivate the recycling pump means when the pressuring sensing tank exceeds a second threshold pressure level that is equal to or greater than the first pressure level. Valve means may interconnect an appliance with a source of water independent of the filtered gray water. The pressure control means may close the valve means when the pressuring sensing tank is at or above a preliminary threshold level and may open the valve means when the pressure sensing tank falls below a secondary threshold level that is less then or equal to the primary pressure level. As a result, the independent source of water is communicably interconnected with the appliance. The means for transmitting may further include second filter means. Such second filter means may comprise at least one of a carbon, an ozone and an ultraviolet filter.

The gravity water filter and/or the recycling pump means may be mounted within the means for storing. Likewise, the spray jets or airhose, and the aerator pump means may be contained in the means for storing.

Preferred appliances that utilize reclaimed water according to this invention may include one or more toilets and an outdoor irrigation apparatus. Typically, the irrigation apparatus includes an underground osmosis pipe.

DETAILED DESCRIPTION OF PREFERRED EMBODIMENTS

Other objects, features and advantages will occur from the following description of preferred embodiments and the accompanying drawings, in which.

Figure 1:
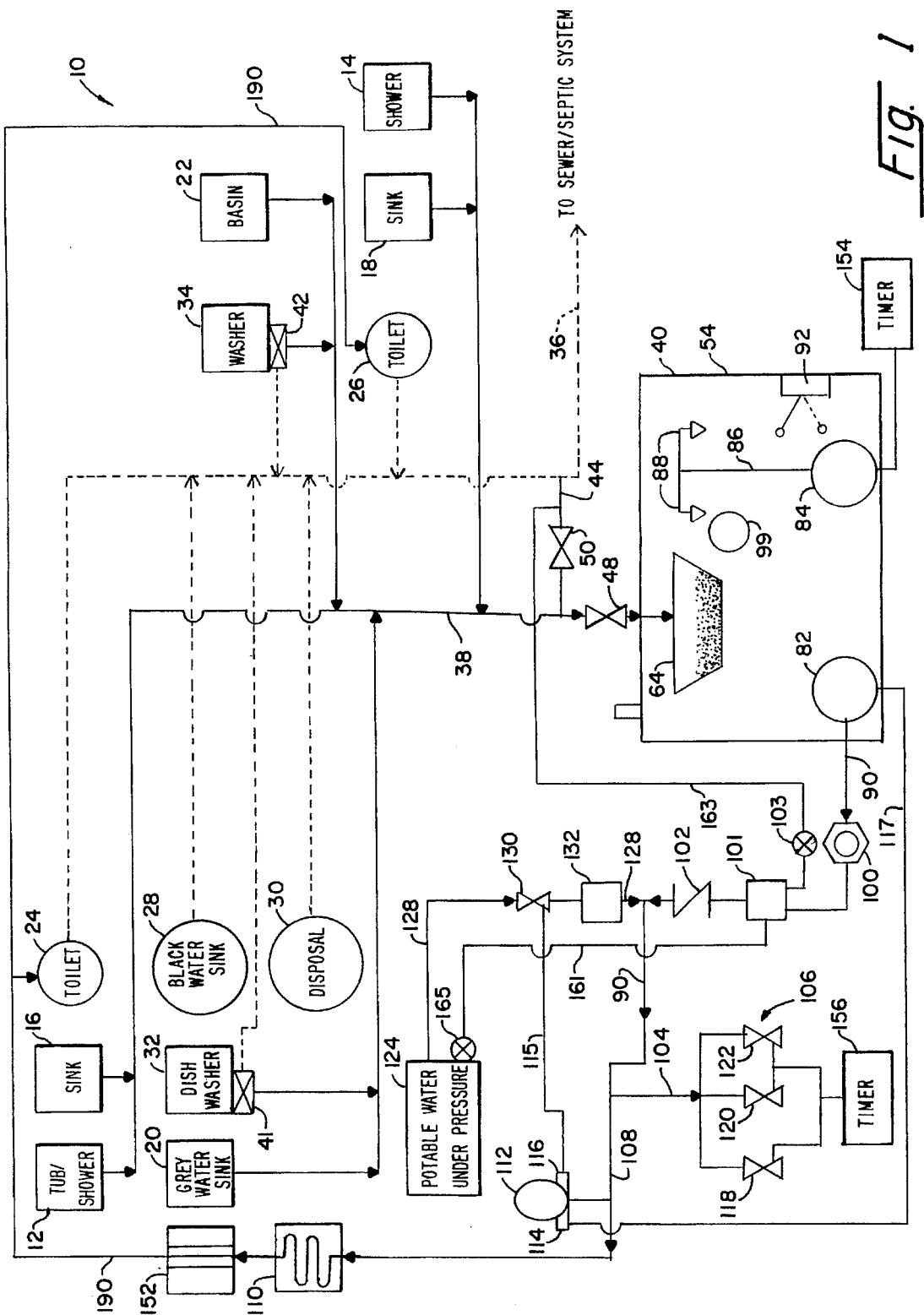
FIG. 1 is a schematic diagram illustrating a preferred gray water reclamation system in accordance with this invention.

There is shown in FIG. 1 a gray water reclamation system 10 that is designed for reclaiming the gray water drained from various household appliances and reusing such gray water in either indoor or outdoor applications. The household includes various appliances that generate waste water. A first group of appliances, including bathroom tubs and showers 12 and 14, bathroom sinks 16 and 18, kitchen sink 20 and washroom basin 22 generate exclusively gray water, which is the type of water to be reclaimed by system 10. Gray waste water typically includes small amounts of soap and detergent and is normally safe for filtering and reuse. A second group of appliances, including toilets 24 and 26, kitchen sink 28, and garbage disposal 30, discharge only black water, which is high in bacteria and is not reclaimed under any circumstances. A third group of appliances, including dishwasher 32 and clothes washer 34 are capable of discharging either black or gray water, depending upon the items being washed. For clarity, the appliances that drain gray water are represented by rectangles and the black water generating appliances are depicted by circles.

Each of the black water appliances drains into a black water line or conduit 36, that discharges into a conventional sewer or septic system. Dashed lines should be understood to represent a conduit which transmits only black water. Conversely, solid lines extending from the appliances represent gray water conduits. Each gray water generating appliance drains its waste water into a common gray water drain conduit 38. The gray water line discharges into an underground storage tank and primary filter apparatus 40. Dishwasher 32 and clothes washer 34 are provided with respective valves 41 and 42 that permit those appliances to drain into either the black water line 36 or the gray water conduit 38. Valves 41 and 42, which may comprise various types of conventional valves, are normally open to the black water conduit. However, they may be adjusted as required, such that water is drained from the dishwasher and clothes washer into gray water conduit 38.

Figure 2:
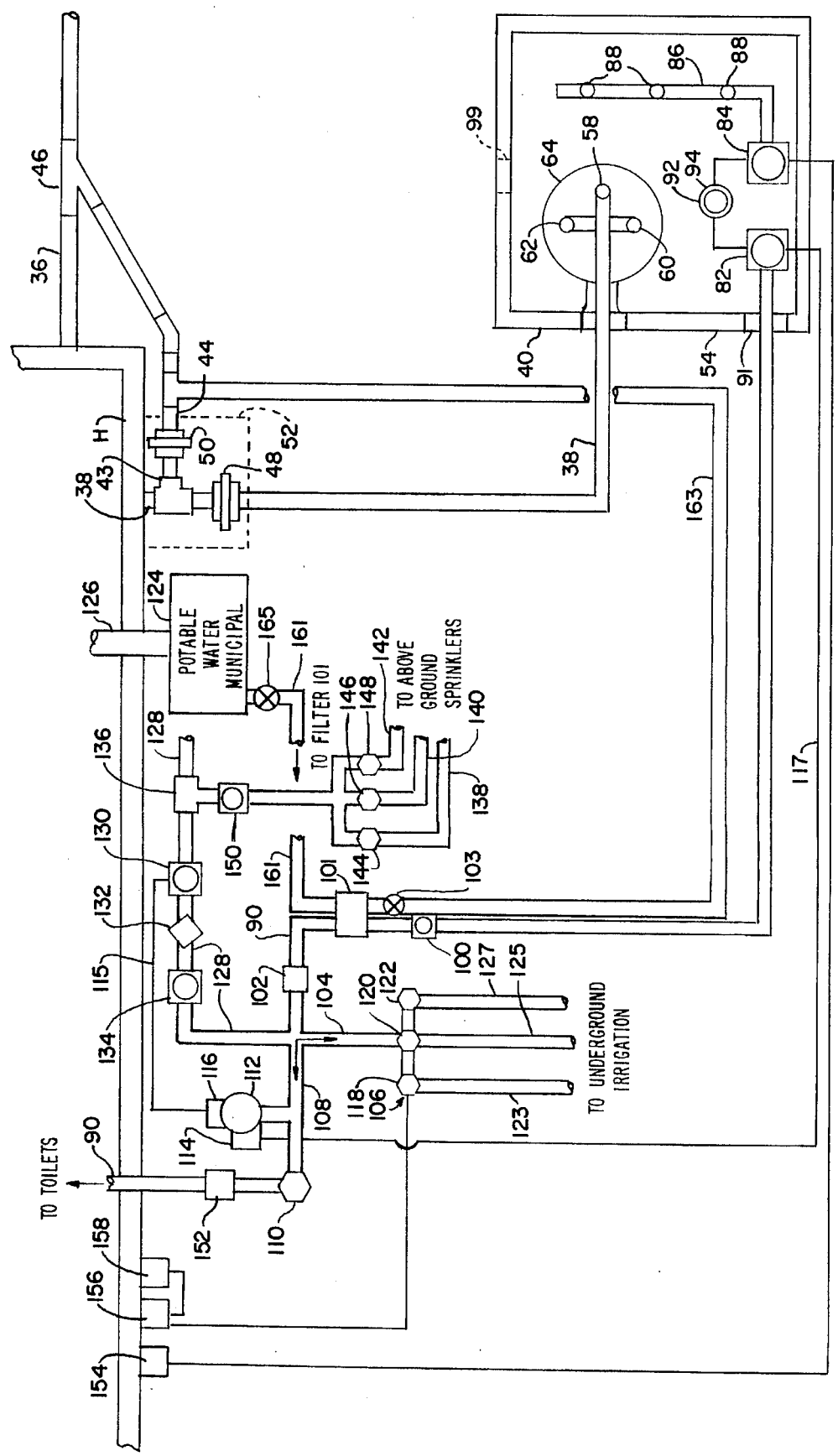
FIG. 2 is a plan, partly schematic view of the principal outdoor components of the reclamation system.
Figure 3:
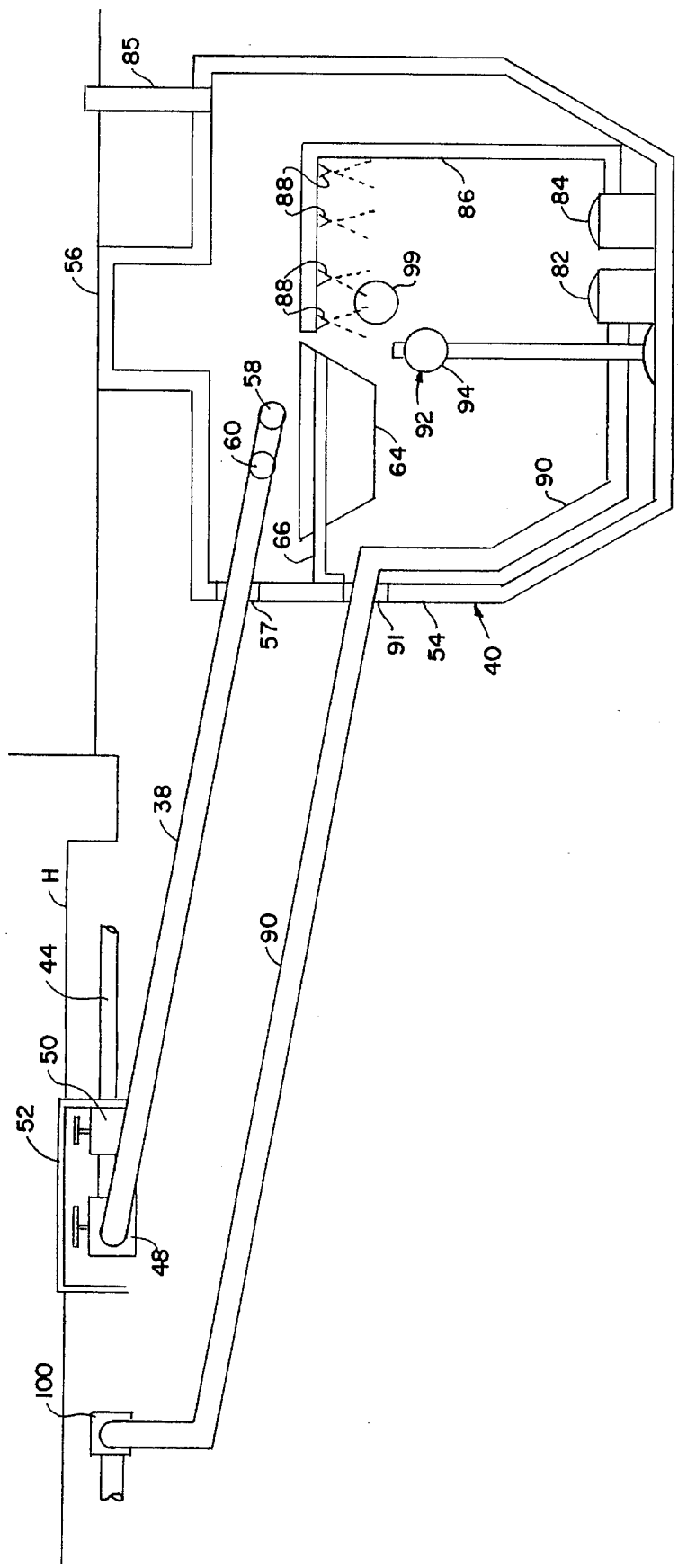
FIG. 3 is an elevational side view of the underground storage tank with one wall removed to illustrate the gravity water filter, the recycling and aerator pumps, the aerator spray jets and the pump deactivation switch.

As better shown in FIGS. 2 and 3, conduit 38 exits the house H from a point proximate ground level. A T-connector 43, FIG. 2, interconnects conduit 38 with one end of a bypass conduit 44. The opposite end of bypass conduit 44 is interconnected through a Y-connector 46 to black water conduit 36, which has exited through an adjacent wall of house H. Black water conduit 36 and gray water conduit 38, as well as all other conduits and pipes described herein, are preferably composed of PVC, although various other natural and synthetic pipe compositions known to those skilled in the art may be employed. A pair of slide valves 48 and 50 (also shown in FIG. 1) permit the gray water exiting house H to be directed either through gray water conduit 38 to storage and filter apparatus 40 or through bypass conduit 44 to black water conduit 36. In the event that servicing of the system is required, valve 48 is closed and valve 50 opened to direct the gray water to the black water conduit and from there to the sewer or septic system. Valves 48 and 50 are enclosed in a container or housing 52, best shown in FIG. 3. This housing is normally kept locked by the owner of the house until the positions of the valves require changing.

Conduit 38 is sloped or pitched slightly downhill from container 52 to tank and filter apparatus 40. More particularly, apparatus 40, shown in FIGS. 1–3, comprises an underground storage tank 54 that is constructed of fiberglass, steel, concrete or other durable and rugged materials. The tank preferably has a capacity that provides a suitable ratio of residential unit density to area being irrigated, although the precise size is not a limitation of this invention. An access hole 56 is provided at ground level through the top of tank 54. Gray water conduit 38 enters through an opening 57 in the side of tank 54. The conduit terminates in an open outlet 58. A pair of additional outlets 60 and 62 (FIG. 2) are formed transversely to conduit 38.

Figure 4:
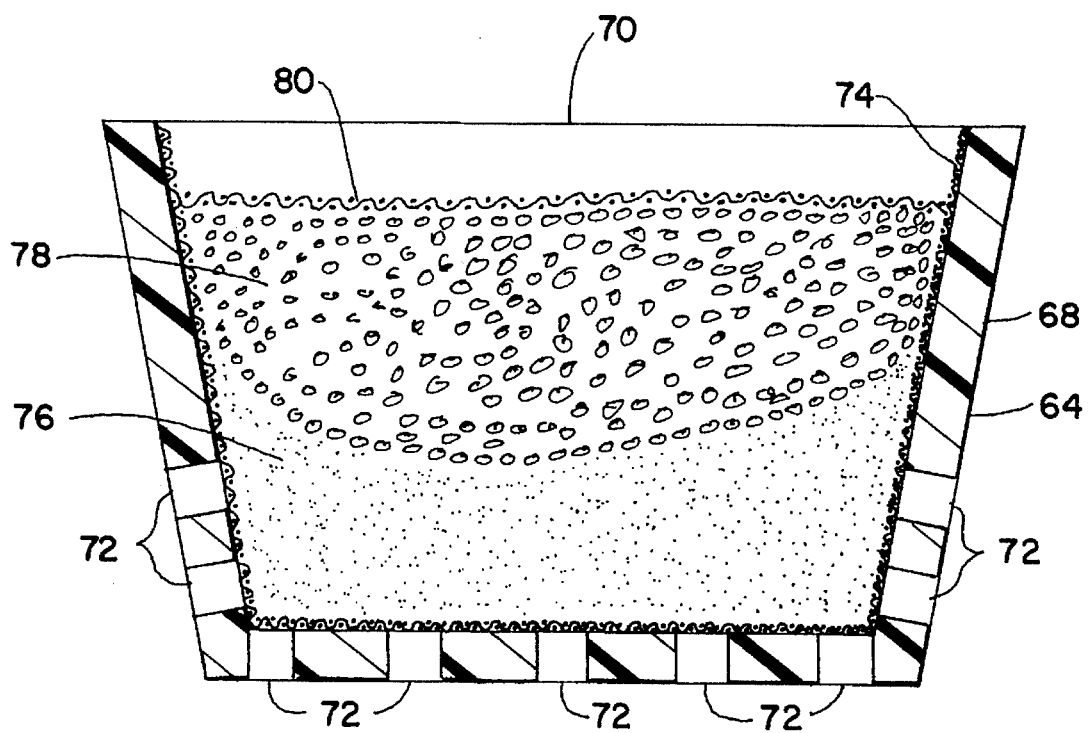
FIG. 4 is an elevational, cross sectional view of a preferred gravity water filter that may be used in this invention.

A primary gravity filter 64, FIGS. 1–3, is mounted to the interior vertical wall of tank 54 beneath outlets 58, 60 and 62 of conduit 38. More particularly, filter 64 is mounted to the tank by a bracket 66. As illustrated in FIG. 4, the filter comprises an outer pot 68 having an upper opening 70 and an interior cavity formed therein. Opening 70 is positioned just below the outlets of conduit 38. The pot may be formed of various materials such as plastic or PVC. A plurality of holes 72 are formed in the bottom and sides of pot 68 to conduct filtered gray water therethrough. A mesh fleer fabric 74 lines the inner wall of the pot. A layer of sand 76 covers the mesh layer 74 and a layer of gravel 78 covers the sand. Finally, a screen filter 80, which may comprise the type of multi-layered filter that is employed in air conditioning applications, covers gravel layer 78. In alternative embodiments multiple screen filters may be interspersed with gravel, fabric and sand layers as required. Gray water that is discharged from outlets 58, 60 and 62 into gravity filter 64 passes through the filter elements described above and collects on the bottom of tank 54. As a result, filter 64 removes large soap particulates, detergent and other relatively minor impurities from the gray waste water such that the water can be reclaimed and reused, as described more fully below.

Referring again to FIGS. 1–3, a recycling pump 82 and an aerator pump 84 are mounted to the floor of tank 54. An aerator pipe and spray bar apparatus 86 is operably connected to aerator pump 84 and includes a plurality of mist jets 88 that are pointed downwardly within the tank. Pump 84 circulates the filtered gray water through pipe 86 and sprays that water in mist form through jets 88. In alternative embodiments, an air pump, not shown, may be used to pump air through the gray water. This aerates and kills anaerobic bacteria in the filtered gray water and helps to decontaminate the water, which would otherwise accumulate bacteria if it were allowed to remain stagnant. A vent 85, FIG. 3, provides fresh air to the interior of tank 54.

Pump 82 removes filtered gray water from tank 54 through a transmission pipe 90 that exits the tank through an opening 91. A pump deactivation switch apparatus 92 deactivates pumps 82 and 84 when the water level in tank 54 drops below a predetermined level. In FIG. 1, switch apparatus 92 is shown schematically. When the water level is above a predetermined level, the switch is raised and closed to activate pumps 82 and 84. However, when the water level drops below the predetermined level, the switch is lowered as shown in phantom, and opened to disconnect the pumps. As a result, the pumps do not burn out due to lack of water in the tank. In FIGS. 2 and 3, switch 92 comprises a single station vertical switch such as is known in the pumping industry. The switch includes a reverse float element 94 that operates in a known manner. When the water level in the tank is above a desired amount, the float element 94 holds the switch closed and permits the pumps to operate. However, as the water level drops, the float element drops with it until eventually switch 92 opens. It should be understood that, in alternative embodiments, various other known switches, such as mercury float switches, microswitches and toggle switches may be utilized and mounted to operate pumps 82 and 84 in a manner known to those skilled in the art. If the gray water level in tank 54 exceeds a certain level, that water is permitted to drain through an opening 99 in the tank, which is connected by an appropriate conduit to the black water or sewer lines. As a result, the gray water level is not permitted to exceed the capacity of tank 54.

Transmission pipe 90 extends to above ground level and then through a gray water meter 100, a secondary filter 101, and a check valve 102. Filter 101 removes residual soap from the gray water. Gray water is transmitted through pipe 90 to either a first branch 104 that is communicably connected to a sprinkler valve manifold 106 or a second branch 108 that is connected to an activated carbon filter 110. A conventional pressure sensing tank 112 is communicably connected to pipe 90 and, more particularly, is connected directly to branch 108. Pressure tank 112 is constructed and operates in a manner known to those skilled in the art. In this application, tank 112 is provided with a pair of pressure control switches 114 and 116 that respond to sensed pressure levels in the manner described more particularly below. In alternative embodiments, a single pressure control switch may be employed. Switch 114 closes and provides a signal through a line 117 to activate pump 82 when the pressure in tank 112 falls below a first threshold level. Switch 114 opens and deactivates pump 82 when the pressure in tank 112 exceeds a second threshold pressure level that is equal to or greater than the first pressure level. An example that illustrates this operation is described below.

A sprinkler valve manifold 106 comprises three sprinkler valves 118, 120 and 122. Each sprinkler valve operates a respective underground irrigation sprinkler. These sprinklers typically feature an osmosis pipe that is disposed beneath a particular flower or vegetable garden, or other area to be irrigated. Although the gray water is effectively filtered by this system, it is preferred that the water reused in irrigation remain underground and not be sprinkled above ground. As a result, airborne viruses in the gray water (which may be generated by washing diapers or other causes) are kept below ground. Preferably, above ground sprinkling is performed by the municipal water supply, although such above ground sprinkling can be accomplished using gray water reclaimed as described in this invention. The osmosis pipes avoid clogging because residual soap is removed by filter 101.

In the event of a failure in the system or where a shortage of reclaimed gray water is otherwise experienced, the municipal water supply is readily accessed by system 10. A potable water supply 124 under city or municipal pressure is shown in FIGS. 1 and 2. A service pipe 126, FIG. 2, from supply 124 is directed into the house. A second service pipe 128, FIGS. 1 and 2, is interconnected with the gray water reclamation system. More particularly, pipe 128 is connected to gray water transmitting pipe 90 through a T-connector 136, a solenoid valve 130 and a vacuum air brake 132. From there, municipal water is directed through branch 104 to sprinkler valve manifold 106 and through branch 108 to second filter 110. Check valve 102 prevents municipal water from flowing back through pipe 90 into tank 54. Similarly, vacuum air brake 132 prevents gray water flowing through pipe 90 from backing up through line 128 into the potable municipal water supply 124. A water meter 134 records the volume of municipal water directed through pipe 128 for a particular task.

Valve 130 is electrically connected to pressure control switch 116. As long as that switch senses that the pressure in tank 112 is at or above a preliminary threshold pressure level, it holds valve 130 closed so that municipal water is not provided to pipe 90. However, when switch 116 senses that the pressure sensing tank has fallen below a secondary threshold pressure level that is less than or equal to the primary pressure level, it sends a signal to valve 130, which opens the valve and provides potable municipal water to pipe 90 and thereby to the underground irrigation system and filter 110.

As shown in FIG. 2, water supply 124 is also connected through T-connector 136 to above ground sprinkler lines 138, 140 and 142. These lines are maintained entirely separate from the gray water reclamation pipe 90. Each of the lines is directed to a particular sprinkling zone and various alternative number of lines may be employed. Each line is operated by opening a respective valve 144, 146 and 148. A meter 150 records the amount of municipal water required for above ground sprinkling.

An ultraviolet filter or ozone generator 152 is communicably connected to the outlet of carbon filter 110. From filter 152, return pipe 190 extends into house H and, as shown in FIG. 1, is communicably connected to each of the toilet tanks within the house. Such interconnections are formed in a conventional manner. Return pipe 190 provides reclaimed gray water to refill the toilet tanks as needed.

A number of controls are mounted to the side of house H. As shown in FIGS. 1 and 2, these include an aerator timer 154 that is programmed to start and stop aerator pump 84 at predetermined time intervals. A sprinkler valve control 156 is similarly programmed to open valves 118, 120 and 122 at predetermined time intervals. This directs either gray water from pipe 90 or municipal water from pipe 128 through respective lines 123, 125 and 127 to perform subterranean irrigation. A rain sensor 158 deactivates the sprinkler control 156 when sufficient rain is detected to make irrigation unnecessary.

A backwash is provided for periodically cleaning secondary filter 101. In particular, as illustrated in FIGS. 1 and 2, a line 161 interconnects potable municipal water supply 124 with filter 101. A second line 163 interconnects filter 101 with discharge conduit 44 that is itself connected to sewer line 36. To periodically clean fleer 101, a valve 165 is opened. As a result, potable water flushes filter 101 of residual soap that has been collected in the filter from line 90. The potable water and soap are transmitted through line 163 to line 44. During the backwash operation, an isolation valve 103 in line 163 is opened. This valve is opened either manually or remotely in a manner known to those skilled in the art. During normal operation while gray water is being pumped through line 90 by pump 82, isolation valve 167 is closed so that gray water is directed through the reclamation system and is not pumped out into the sewer line. One or more additional isolation valves, not shown, may be used to close transmission line 90 during the backwash operation. In other embodiments, the secondary filter 101 may be positioned at various other locations along line 90 after pump 82. For example, the filter 101 may be positioned below ground and prior to meter 100. Filter 101 may alternatively include a replaceable carbon element, which eliminates the need for a filter backwash.

During normal operation of system 10, gray water is drained from appliances 12, 14, 16, 18, 20, 22, (as well as from appliances 32 and 34 when their switches are appropriately set) into gray water conduit 38. The remaining appliances drain their waste water into black water line 36. The gray waste water is directed passively through conduit 38, which slopes from the house in a gentle, downhill manner, to storage tank 54. Sumps, pumps and other means for actively delivering the waste water to the tank are eliminated so that the risk of system failure is reduced. The gray water is discharged through outlets 58, 60 and 62 into gravity filter 64. Therein, the discharged gray water passes downwardly under the force of gravity through screen 80, gravel layer 78, sand layer 76, mesh layer 74 and perforated pot 68. The filtered gray water then collects on the floor of tank 54. Aerator timer 154 directs aerator pump 84 to operate a preset times; for example, from 7 a.m. to 4 p.m., seven days a week. As a result, water is circulated through sprayer apparatus 86 and sprayed by mist heads 88. This exposes the gray water to oxygen, which kills excess bacteria in the water.

Sprinkler timer 156 is programmed to open valves 118, 120 and 122 at predetermined times; for example from 2 a.m. to 4 a.m., three days a week. This eventually causes the pressure in tank 112 to drop below a predetermined level (e.g. 20 p.s.i.). Switch 114 closes and sends a signal over line 117 that activates pump 82. As a result, pump 82 draws filtered gray water from tank 54 and moves that water through pipe 90 to branches 104 and 108 for use by the underground irrigation system and toilets, respectively.

At the end of the predetermined time (e.g. 4 a.m.) one or more of the valves 118, 120 and 122 is closed by timer 156. This causes tank 112 to repressurize. When a second threshold pressure level (25 p.s.i.) is reached switch 114 opens to deactivate pump 82, which in turn stops delivering filtered gray water from tank 54 to manifold 106 and tank 112. Gray water continues to be filtered and collected in tank 54 and the entire sequence may be repeated so that gray water is delivered to the underground sprinkler system at the predetermined times. If, in the interim, adequate rain falls, sensor 158 keeps manifold 106 closed so that the pump 82 is not needlessly operated. If, as a result, the gray water level in tank 54 becomes too high, the excess water is drained through outlet 99. When the sensor dries out, the controller 156 is reactivated to operate the sprinklers, as described above.

Flushing household toilets 24 and 26 likewise tends the reduce the pressure in tank 112. When the pressure in tank 112 drops below 20 p.s.i., switch 114 activates pump 82. This causes gray water to circulate through filters 110 and 152. From there the filtered gray water is directed through pipe 190 back into the house to refill the toilets 24 and 26. At the same time, tank 112 repressurizes until it reaches 25 p.s.i. This again causes switch 114 to deactivate pump 82 until water is next required by either the underground sprinklers or toilets.

When the supply of gray water drops below a predetermined level in tank 54, float switch 92 deactivates pumps 82 and 84. This prevents the pumps from burning out due to lack of water in the tank. Because the pumps 82 and 84 are both deactivated, the pressure level in tank 112 gradually decreases in response to water usage by the toilets and underground irrigation system. Eventually, the pressure reaches a lowest desirable threshold setting (e.g. 15 p.s.i.). At that level pressure switch 116 closes and sends a signal over line 115, which opens solenoid valve 130. This connects potable water supply 124 with pipe 90 and provides city water to the underground sprinkler system or toilets, as required. Gradually, potable water supply 124 repressurizes tank 112 to 25 p.s.i. As a result, switch 116 closes valve 130 and disconnects water supply 124 from pipe 90. Valve 130 remains closed until the pressure in tank 112 again drops to 15 p.s.i., at which point the process is repeated.

The pressure threshold levels described herein are for illustrative purposes only. It should be understood that various pressure levels may be employed within the scope of the invention. Moreover, the preset times and durations are variable and may be programmed as required.

Although specific features of the invention are shown in some drawings and not others, this is for convenience only, as each feature may be combined with any or all of the other features in accordance with the invention. Other embodiments will occur to those skilled in the art and are within the following clams.

What is claimed is:

1. A gray water reclamation system comprising:

a water filter;

gray water conduit means for receiving exclusively gray water from at least one household source and passively delivering said gray water through said water filter to remove impurities therefrom;

means for temporarily storing said filtered gray water;

an appliance that utilizes filtered gray water;

means for sensing that said appliance is in need of filtered gray water;

means, responsive to said means for sensing, for directing said filtered gray water to said appliance in need of filtered gray water;

said means for directing including means, communicably interconnected between said means for storing and said appliance, for transmitting filtered gray water therethrough and recycling pump means, operably engaged with said means for transmitting, for selectively pumping filtered gray water through said means for transmitting from said means for storing to said appliance;

outside irrigation means;

irrigation valve means, communicably joined to said means for transmitting at a selected location, for interconnecting said outside irrigation means and said means for transmitting;

irrigation valve control means for opening and closing said irrigation valve means to respectively introduce gray water into and restrict gray water from said outside irrigation means;

means for sensing rainfall and directing said control means to close said irrigation valve means when a predetermined level of rainfall is sensed; and means, disposed in said means for transmitting downstream of said selected location at which said irrigation valve means is communicably joined to said means for transmitting, for additionally filtering the water being transmitted to said appliance.

2. The system of claim 1 in which said gray water conduit means includes a common gray water line that receives gray water from multiple household sources and further including a black water discharge conduit for discharging black water from at least one household source, a single bypass conduit that communicably interconnects said gray water conduit means and said black water discharge conduit and valve means for selectively diverting said received gray water from said gray water line to said bypass and black water discharge conduits.

3. The system of claim 1 further including means for aerating said filtered gray water to reduce the level of bacteria therein.

4. The system of claim 3 in which said means for aerating include spray jet means and aerator pump means for pumping said filtered gray water through said spray jet means.

5. The system of claim 4 further including aerator control means for operating said aerator pump means at predetermined levels.

6. The system of claim 4 further including means for automatically deactivating said aerator pump means when said filtered gray water in said means for storing falls below a predetermined level.

7. The system of claim 4 in which said spray jet means and said aerator pump means are contained in said means for storing.

8. The system of claim 3 in which said means for aerating includes an aerator pump for introducing oxygen into said filtered gray water.

9. The system of claim 1 in which said means for additionally filtering includes a carbon filter.

10. The system of claim 1 in which said water filter is mounted within said means for storing.

11. The system of claim 1 in which said recycling pump means is contained within said means for storing.

12. The system of claim 1 in which said appliance includes a toilet.

13. The system of claim 1 in which said appliance includes an irrigation apparatus.

14. The system of claim 1 further including a secondary filter for removing residual soap from said filtered gray water.

15. The system of claim 14 further including means for backwashing said secondary filter to remove residual soap therefrom.

16. A gray water reclamation system comprising:

a water filter; gray water conduit means for receiving exclusively gray water from at least one household source and passively delivering said gray water through said water filter to remove impurities therefrom;

means for temporarily storing said filtered gray water;

an appliance that utilizes filtered gray water;

means for sensing that said appliance is in need of filtered gray water;

means, responsive to said means for sensing, for directing said filtered gray water to said appliance in need of filtered gray water;

said means for directing including means, communicably interconnected between said means for storing and said appliance, for transmitting filtered gray water therethrough and recycling pump means, operably engaged with said means for transmitting, for selectively pumping filtered gray water through said means for transmitting from said means for storing to said appliance;

said means for sensing including a pressure sensing tank that is operably and communicably interconnected with said means for transmitting and further including pressure control means that activates said recycling pump when said pressure tank falls below a first threshold pressure level and deactivates said recycling pump when said pressure sensing tank exceeds a second threshold pressure level that is equal to or greater than said first pressure level;

a service line that bypasses said means for storing and interconnects a source of pressurized fresh water independent of said filtered gray water with said means for transmitting, downstream of said means for storing;

valve means operably interconnected with said service line and being responsive to said pressure control means for closing when said pressure sensing tank is at or above a primary threshold pressure level and opening when said pressure sensing tank falls below a secondary threshold pressure level that is less than or equal to said primary pressure level to communicably interconnect said fresh water source with said means for transmitting and said appliance;

outside irrigation means;

irrigation valve means, communicably joined to said means for transmitting at a selected location, for interconnecting said outside irrigation means and said means for transmitting;

irrigation valve control means for opening and closing said irrigation valve means to respectively introduce gray water into and restrict gray water from said outside irrigation means;

means for sensing rainfall and directing said control means to close said irrigation valve means when a predetermined level of rainfall is sensed; and means, disposed in said means for transmitting downstream of said location at which said irrigation valve means is communicably joined to said means for transmitting, for additionally filtering the water being transmitted to said appliance.

17. A gray water reclamation system comprising:

a water filter;

gray water conduit means for receiving exclusively gray water from at least one household source and passively delivering said gray water through said water filter to remove impurities therefrom;

means for temporarily storing said filtered gray water;

an appliance that utilizes filtered gray water;

means for sensing that said appliance is in need of filtered gray water;

means, responsive to said means for sensing, for directing said filtered gray water to said appliance in need of filtered gray water;

said means for directing including means, communicably interconnected between said means for storing and said appliance, for transmitting filtered gray water therethrough and recycling pump means, operably engaged with said means for transmitting, for selectively pumping filtered gray water through said means for transmitting from said means for storing to said appliance;

outside irrigation means;

irrigation valve means for interconnecting said outside irrigation means and said means for transmitting;

irrigation valve control means for opening and closing said irrigation valve means to respectively introduce gray water into and restrict gray water from said outside irrigation means;

means for sensing rainfall and directing said control means to close said irrigation valve means when a predetermined level of rainfall is sensed;

a secondary filter for removing residual soap from said filtered gray water; and means for backwashing said secondary filter to remove residual soap therefrom.

18. The system of claim 17 in which said means for transmitting includes second filter means.

19. The system of claim 17 in which said pressure control means includes a first pressure control switch for activating and deactivating said recycling pump means and a second pressure control switch for opening and closing said valve means.

* * * * *